United States Patent [19]

Nakai

[11] 3,970,510
[45] July 20, 1976

[54] METHOD AND APPARATUS FOR CONVERTING A LIQUID MATERIAL INTO A POWDER

[75] Inventor: Muneaki Nakai, Osaka, Japan

[73] Assignee: Yashima Chemical Engineering Co., Ltd., Osaka, Japan

[22] Filed: Sept. 3, 1974

[21] Appl. No.: 502,318

[30] Foreign Application Priority Data
Sept. 3, 1973 Japan.............................. 48-99397

[52] U.S. Cl. ........................ 159/6 WH; 159/25 R; 159/49
[51] Int. Cl.² ...................... B01D 1/22; B01D 1/24; B01F 7/02
[58] Field of Search ............. 159/6 W, 6 WH, 25 R; 34/108, 109; 202/236; 259/9, 10, 57, 90

[56] References Cited
UNITED STATES PATENTS

| | | | |
|---|---|---|---|
| 3,058,516 | 10/1962 | Brunk | 159/6 W |
| 3,225,817 | 12/1965 | Thier | 159/6 W |
| 3,250,311 | 5/1966 | Thier | 159/6 W |

FOREIGN PATENTS OR APPLICATIONS

| | | | |
|---|---|---|---|
| 1,121,587 | 1/1962 | Germany | 159/6 W |
| 200,954 | 4/1957 | Sweden | 159/6 W |

*Primary Examiner*—Jack Sofer
*Attorney, Agent, or Firm*—Sughrue, Rothwell, Mion, Zinn & Macpeak

[57] ABSTRACT

A method of and apparatus for converting a liquid material such as a solution or slurry into a powder.

2 Claims, 7 Drawing Figures

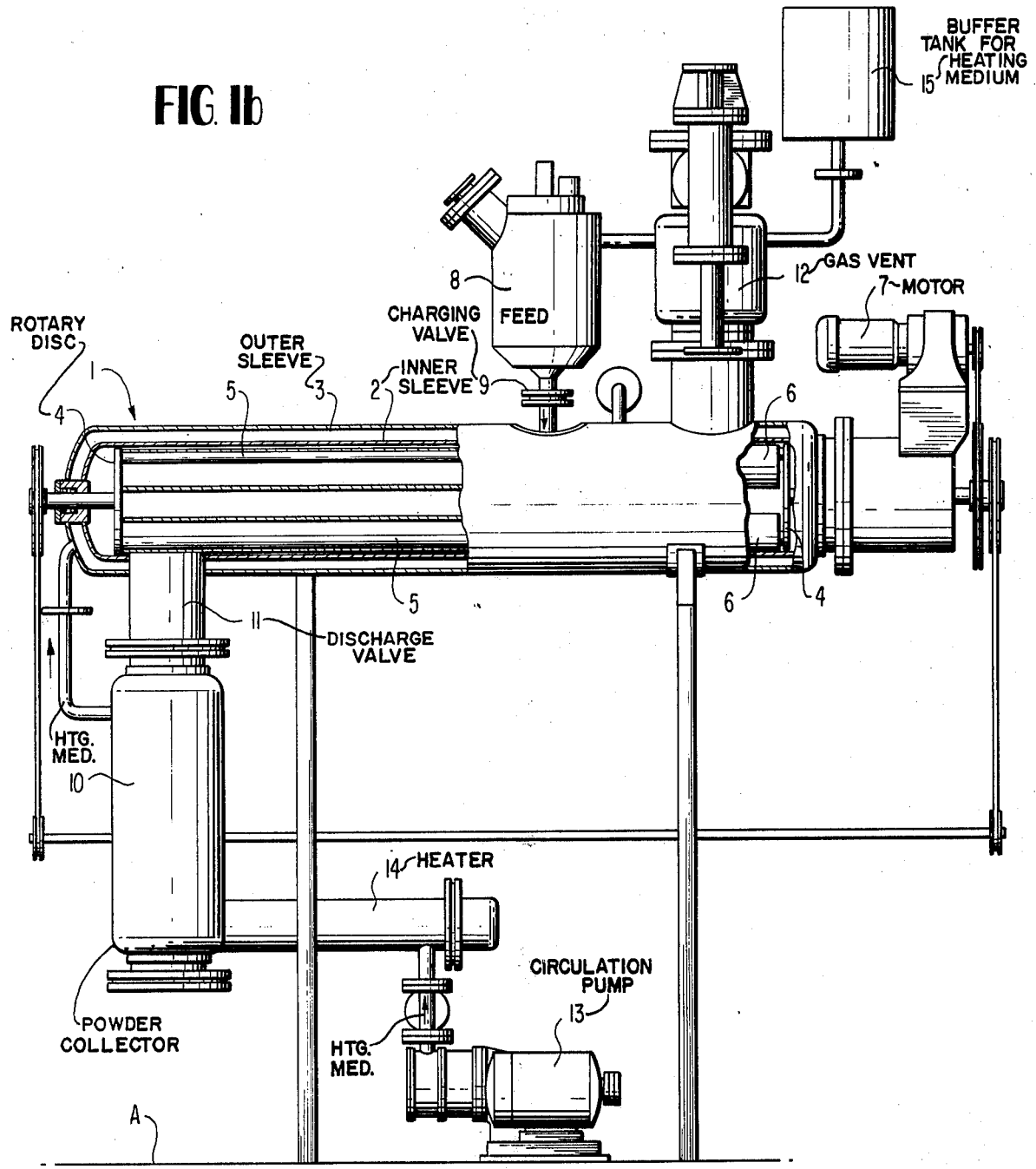

METHOD AND APPARATUS FOR CONVERTING A LIQUID MATERIAL INTO A POWDER

BACKGROUND OF THE INVENTION

1. Field of the Invention

The present invention relates to the drying of a liquid material such as a solution or slurry, and, more particularly to a method of converting a liquid material such as a solution or slurry into a powder of the material by drying and to an apparatus for effecting the drying.

2. Description of the Invention

In the field of industrial chemicals and in manufacturing pigments, drugs, foods and resinous materials, commonly liquid materials such as solutions or slurries are converted to a powder from by drying.

Hitherto, many types of methods and devices have been proposed or have been actually employed for thus conversion. However, most of these methods and devices do not perform the conversion at high efficiency and are inconvenient especially in that the resultant powder tends to attach or adhere to the internal fittings of the drying means thereby considerably reducing the efficiency of the apparatus.

SUMMARY OF THE INVENTION

It is therefore an object of the invention to provide a method of converting a liquid material such as a solution or a slurry into a powder by drying at a high efficiency.

It is another object of the invention to provide an apparatus which can be used to achieve the conversion in a high rate without being accompanied by adhesion of the powder to the interior fittings of the apparatus.

Accordingly the invention provides a method of converting a liquid material such as a solution or a slurry into a powder comprising feeding the liquid material comprising the material dissolved or dispersed in a liquid into a drum which is closed at both ends, heating and stirring the liquid material within the drum to evaporate and separate the liquid from the material, pressing and abrading the material separated from the liquid material to change it into a powder of the material between the inner wall of the drum and the outer peripheral surface of at least one roller disposed within the drum, and then collecting the thus formed powder.

According to another aspect of the invention, the invention provides an apparatus for converting a liquid material such as a solution or a slurry into a powder comprising a cylindrical drum closed at both ends, means for heating the cylindrical drum, a pair of rotary discs at both axial ends of the cylindrical drum arranged coaxially with the drum, at least one shaft disposed eccentrically within the cylindrical drum and connecting each of the rotary discs, at least one cylindrical roller loosely mounted on the shaft in such a manner that the peripheral surface of the roller approaches the inner wall and recedes from the inner wall of the drum as the rotary discs rotate, a liquid material supplying means connected to one end of the cylindrical drum, a powder collecting chamber connected to the other end of the cylindrical drum and means communicating with the interior of the cylindrical drum for removing a gaseous medium.

BRIEF DESCRIPTION OF THE DRAWINGS

FIG. 1b is a schematic side elevation of the apparatus of FIG. 1 with a portion thereof being shown in section.

DETAILED DESCRIPTION OF A PREFERRED EMBODIMENT

These and other objects, advantages, features of the invention will become more from the following description taken in connection with accompanying drawings.

Figure 1A:
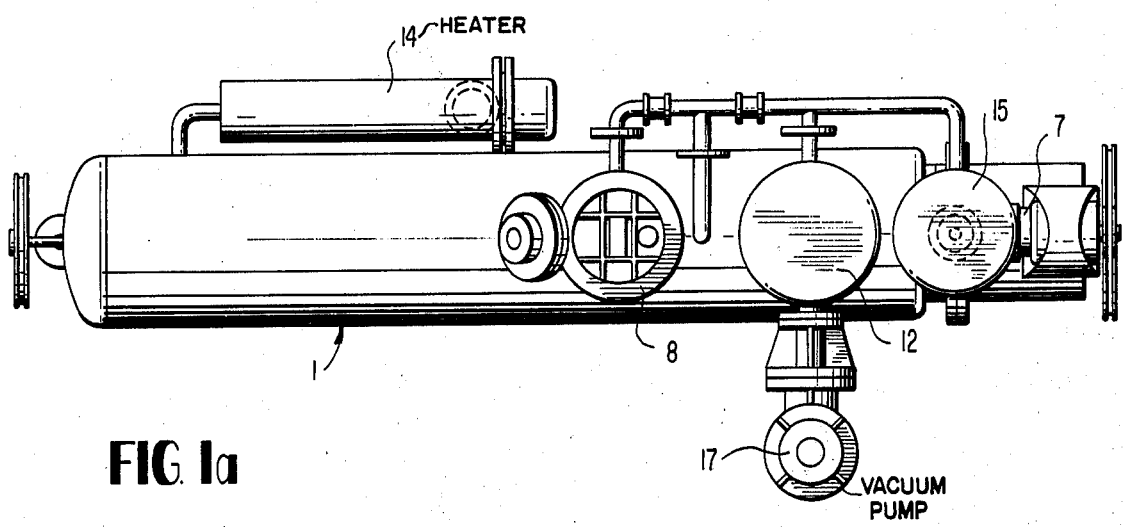
FIG. 1a is a plan view of an apparatus embodying the present invention.
Figure 2A:
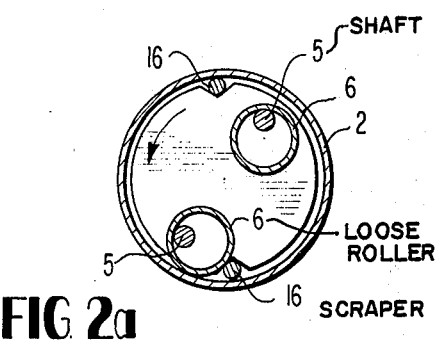
FIG. 2 is a schematic sectional view of the drum incorporated in the apparatus of FIGS. 1a and 1b, and is explanatory of the sequential operation of the apparatus.
Figure 2B:
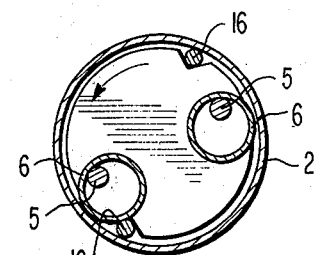
Figure 2C:
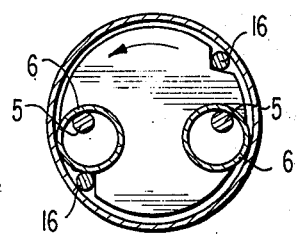
Figure 2D:
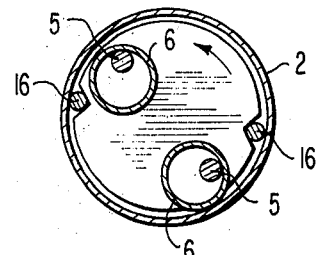
Figure 2E:
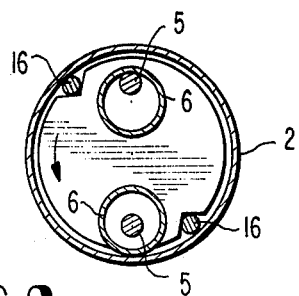

Referring to FIG. 1, an apparatus for solidifying a liquid material such as a solution or a slurry embodying the present invention comprises a generally cylindrical drum designated by numeral 1 mounted on a base A. The drum 1 comprises an outer sleeve 3 and an inner sleeve 2 which define therebetween a heating jacket for accommodating a heating medium. A pair of rotary discs 4,4 which are located at the respective ends of the inner sleeve 2 and which are adapted to rotate while maintaining an air tight contact between the inner surface of the inner sleeve 2 is provided within inner sleeve 2. A pair of eccentric supporting shafts 5,5 connect both rotary discs 4,4 to each other and extend parallel to but eccentrically with the axis of rotation of the rotary discs 4,4. Each shaft 5,5 loosely carries a cylindrical roller 6,6 as seen from FIG. 2, each of the rollers being adapted to rotate on the associated shaft 5 as the shaft 5 revolves in accordance with the rotation of the rotary discs 4,4, in such a manner that the peripheral surface of the roller 6 approaches the inner surface and recedes from the inner surface of the inner sleeve 2. Numeral 7 designates a motor for driving the rotary discs 4,4. A liquid material supplying means 8 is connected to the inner sleeve 2 through a charging valve 9 for supplying liquid material into the inner sleeve 2. Also a collecting means 10 is connected to the inner sleeve 2, in order to collect the powder from the sleeve 2, through a discharge valve 11.

Another means connected to the inner sleeve 2 is a vent pipe 12 for removing the gaseous solvent separated from the material to the exterior of the sleeve 2. A vacuum pump 17 connected to the vent pipe 12 assists the drying within the inner sleeve by evacuating the latter. A circulation pump 13 is provided for feeding a liquid heating medium to a heater 14. The heating medium is then delivered to the jacket between the inner and the outer sleeve 2,3 of the drum 1, through a cover of the collecting chamber 10, and is further delivered to jackets of liquid material supplying means 8 and of the vent pipe 12. Numeral 15 designates a buffer tank incorporated in the circuit for the heating medium.

In operation, the liquid material in the form of a solution in a solvent or a slurry in a liquid medium is fed to the liquid material supplying means 8. Upon opening of the charging valve 9, the liquid material is introduced into the space within the inner sleeve 2. The liquid material thus introduced is then stirred by the rollers 6,6 during which the heating medium guided into the jacket heats the liquid material. This stirring and heating of the material is assisted by the evacuation effected by the vacuum pump 17 in vaporizing and separating the solvent from the material, and the resultant gaseous solvent is discharged by the discharge pipe 12 under suction from the pump 17. The residual solidified material is further pressed and abraded between the peripheral surface of the rollers 6,6 and the inner surface of the inner sleeve 2, and turned into powder.

The operation of the rollers 6,6 can be more clearly seen from FIG. 2, in which five stages of the operaton of the apparatus are shown in sequence, from FIG. 2a to FIG. 2e. Namely, the rollers 6,6 undergo a complicated rotary motion as illustrated, as the shafts 5,5 revolve around the axis of rotation of the rotary discs 4,4 in accordance with the rotation of the rotary discs, with this complicated rotary motion being governed by both of the supporting shafts 5,5 and the inner surface of the innner sleeve 2. During this complicated rotary motion of the rollers 6,6 the solid material caught between the rollers 6,6 and the inner surface of the inner sleeve 2 is conveniently pressed and abraded into a powder. A pair of scraping rods 16,16 secured to the rotary discs 4,4 for rotary motion therewith serve to scrape and remove the solid material adhering to the inner surface of the inner sleeve 2, thereby enhancing the efficiency of heat transfer at that surface. The solid material adhering to the scraper rods 16,16 is conveniently pressed by the rollers 6,6 to be converted into a powder.

It will be understood from the foregoing description that the liquid material is converted into a powder at a high efficiency, because the solid material does not adhere to the drums, the rollers and the scraping blades, which is attributable to the steps of stirring and heating the liquid material within the drum thereby enhancing the evaporation and the separation of the solvent and of pressing and abrading the separated solid material between the inner surface of the drum and the peripheral surface of the roller disposed in the drum.

It is also to be noted that an apparatus having the simple construction as described can be used to convert a liquid material into a powder at a high rate, because of the complicated rotary motion of the rollers which operates with the inner surface of the drum to press and abrade the material to convert the material into a powder, which rotary motion can simply be effected by driving the rotary discs.

It is further understood by those skilled in the art that the foregoing description is a preferred embodiment of the invention and that various changes and modifications may be made therein without departing from the spirit and the scope thereof.

What is claimed is:

1. A method of converting a solution or slurry into a powder comprising:

feeding said solution or slurry comprising a material dissolved or dispersed in a liquid into a horizontally elongated fixed drum closed at both ends, heating and stirring the solution or slurry within said drum to evaporate and separate the liquid from the dissolved or dispersed material with the now solidified and dispersed material in semi-solid form adhering to the inner wall of the drum, moving at least one scraper extending longitudinally within said drum parallel to said drum axis and adjacent said drum inner wall about a circular path defined by the drum axis to scrape accumulated solidified and dispersed material from said drum wall, and causing at least one loosely supported roller extending parallel to the scrapers and adjacent thereto to move along a similar proximate circular path and to periodically contact said scraper to transfer solidified and dispersed material from said scraper to the roller periphery and to periodically contact the inner wall of drum to press said transferred solidified and dispersed material on said roller periphery against the inner wall of said drum to dry the same into powdered form, and collecting the thus formed powder.

2. An apparatus for solidifying a solution or slurry into powder comprising:

a horizontal cylindrical drum closed at both ends, means for heating said drum, a pair of axially displaced transverse rotary discs provided at respective ends of said drum and therewithin, at least one shaft disposed eccentrically within said drum and connecting said rotary discs to each other, at least one scraper extending longitudinally between said rotary discs and fixed at respective ends to the peripheries of the discs for contact with the inner wall of said drum to scrape solidified and dispersed material from said drum wall during rotation of said discs, at least one elongated cylindrical roller loosely mounted on said at least one shaft in such a manner that the peripheral surface of the roller approaches toward and recedes from the inner wall of said drum by gravitational action as the rotary discs rotate to press and abrade the partially solidified and dispersed material, said scraper being circumferentially spaced from said at least one shaft a distance such that during rotation of said cylindrical roller on said at least one shaft, the periphery of said roller contacts said scraper by gravitational action and said partially solidified and dispersed material is transferred from said scraper to said roller, a solution or slurry supplying means connected to one end of said drum, a powder collecting chamber connected to the other end of said drum, and means communicating with the interior of said drum for removing solute substances therefrom;

whereby, said scraper removes solidified and dispersed material adhering to the inner surface of said drum, said roller removes solidified and dispersed material from said scraper by contact therewith, and solidified material is pressed and abraded between the peripheral surface of the roller and the inner surface of the drum to convert it into a powdered state prior to removal.

* * * * *